(12) United States Patent  
Ferlitsch (10) Patent No.: US 7,405,844 B2
(45) Date of Patent: Jul. 29, 2008

(54) PSEUDO PRINT JOB SYSTEM AND METHOD FOR SCAN JOB DESPOOLING

(75) Inventor: Andrew Rodney Ferlitsch, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 1121 days.

(21) Appl. No.: 10/685,241

(22) Filed: Oct. 14, 2003

(65) Prior Publication Data

US 2005/0081137 A1    Apr. 14, 2005

(51) Int. Cl.
*G06K 15/00* (2006.01)
(52) U.S. Cl. .................. 358/1.6; 358/1.18; 358/1.16
(58) Field of Classification Search ............. 358/1.3, 358/1.6, 1.18, 1.13, 1.16, 1.8; 345/581
See application file for complete search history.

(56) References Cited

U.S. PATENT DOCUMENTS 5,638,511 A * 6/1997 Nezu ........................ 726/5
6,246,487 B1 6/2001 Kobayashi et al. ......... 358/1.13
6,934,046 B1 * 8/2005 Nishikawa et al. ......... 358/1.15
2002/0012453 A1 1/2002 Hashimoto et al. ......... 382/112
2002/0054339 A1 5/2002 Arakawa .................... 358/1.15
2003/0007179 A1 * 1/2003 Ferlitsch .................... 358/1.16

* cited by examiner

*Primary Examiner*—Jerome Grant, II
(74) *Attorney, Agent, or Firm*—Law Office of Gerald Maliszewski; Gerald Maliszewski (57) ABSTRACT

A pseudo print job system and method are provided for managing scan jobs. The method comprises: scanning a document at the scanning device; spooling the scan job in storage; sending a pseudo print job request to the scanning device, from a connected client; despooling the scan job from storage in response to the pseudo print job request; and, sending the scan job to a connected destination. The spooling of the scan job in storage may include storing the scan job in a scanning device internal memory, a network-connected server memory, or a connected client memory. The scan jobs are sent to a destination specified in the pseudo print job request. Sending a pseudo print job request for the scan job includes the use of either a network scan-enabled print driver or an independent network scan application. Either way, the pseudo print job request is sent via the client's print subsystem.

37 Claims, 8 Drawing Sheets

PSEUDO PRINT JOB SYSTEM AND METHOD FOR SCAN JOB DESPOOLING

BACKGROUND OF THE INVENTION

1. Field of the Invention

This invention generally relates to digital document imaging processes and, more particularly, to a scanning environment method for spooling a network scan job to storage, and subsequently pulling the scan job from storage through the print subsystem, as a pseudo print job.

2. Description of the Related Art

When a network scan job is spooled to local or offline storage by a multifunctional peripheral (MFP), the retrieving of the scan job from storage may not be intuitive to the user, since the scan retrieval system is independent of the pre-existing print subsystem. That is, the scanning subsystem is considered separate from the print subsystem. Conventionally, a print subsystem is not used for despooling (requesting and/or retrieving) a network scan job from storage to the client. There is no combined scanning/printing MFP driver. Neither is there a way of sending despooling commands for a network scan job in storage via the installed printer subsystem, such as an installed printer in a Microsoft (MS) printers folder.

Rather, the despooling of a network scan job from storage, to the client, must be requested through a network scanning enabled application, or requested via direct access to the MFP using either the front panel or a device web page. Such a scan job retrieval process may include the following steps:

a. Selecting the targeted MFP by specifying the installed scanner or MFP;

b. Specifying and sending a network scan job retrieval request via the installed scanner's scan driver.

However, the selection of the targeted MFP is prone to human error, especially in networks including several MFPs. The user may incorrectly select a network address or domain name for a locally or network-installed MFP.

Figure 1A:
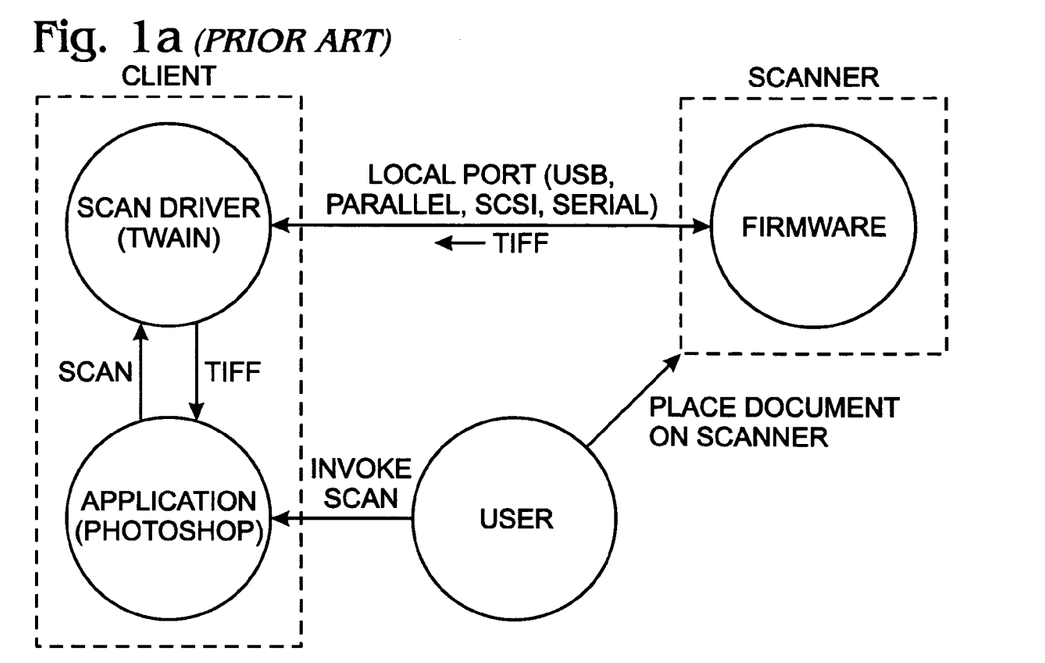
FIG. 1a is a depiction of a locally connected scanner (prior art).

FIG. 1a is a depiction of a locally connected scanner (prior art). More conventionally, scanning is usually done as a local scan job. In this case, the scanner is typically immediately adjacent to the client computing device and connected by a local port, such as a parallel, serial, SCSI or USB port. Before scanning any jobs, the user performs a one-time installation of a compatible scanner driver, such as the Twain scan driver. To initiate a scan job, the user performs the following steps:

1. Place the documents to be scanned on the scanner;
2. Invoke a scan capable application, such as Adobe Photoshop®;
3. From the scan capable application, initiate the scan, by:
   a. Selecting a File menu, followed by a Scan Menu (File->Scan);
   b. Selecting the scanner driver (e.g., Twain driver); and,
   c. Selecting OK.

Figure 1B:
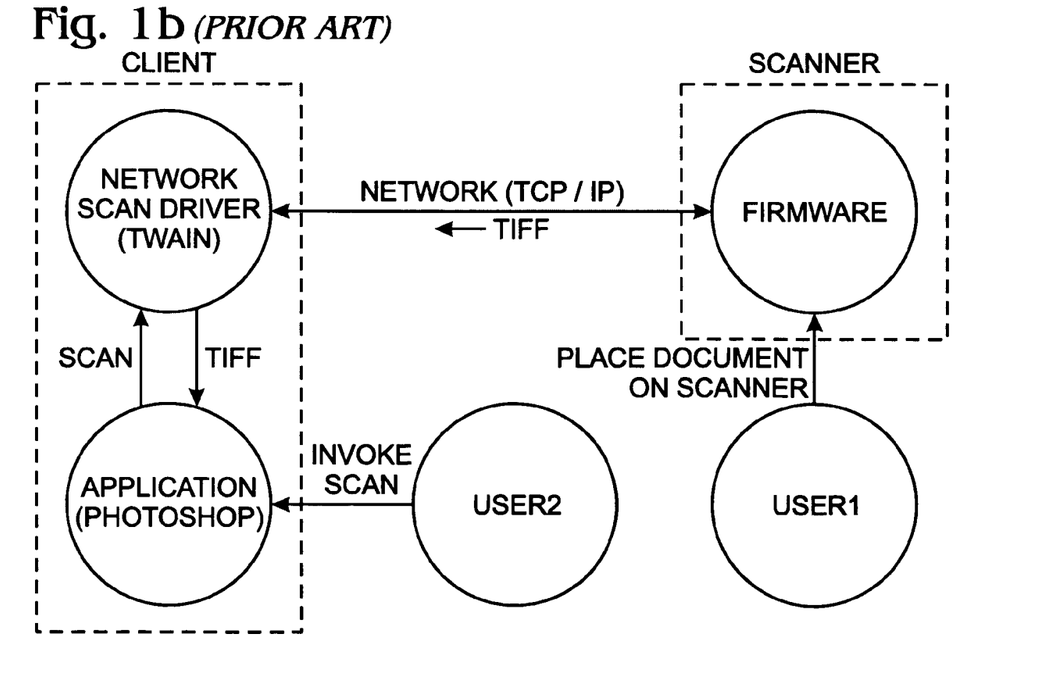
FIG. 1b is a depiction of a network-connected scanner (prior art).

FIG. 1b is a depiction of a network-connected scanner (prior art). Before scanning any jobs, the user performs a one-time installation of a compatible scanner driver, such as the Twain scan driver. To initiate a scan job, the user may perform the following steps:

1. Walk over to scanner and place documents to scan on the scanner;
2. Walk back to client computing device and invoke a scan capable application;
3. From the scan capable application, initiate the scan, by:
   a. Select File->Scan;
   b. Select scanner driver (e.g., Twain driver); and,
   c. Select OK.
4. Walk back to scanner and remove documents.

In the current art, there are several methods for scanning a scan job from a network-connected scanning device without the use of a scan driver. In these methods, the scan job is typically:

1. Invoked from the scanner.
2. Sent to a pre-specified destination profile.
3. Some transport and data protocol is used to deliver the scan job to a destination (e.g., client).

It would be advantageous if a user could leverage pre-existing knowledge of the print subsystem to retrieve scan jobs. That is, it would be advantageous if the despooling of a network scan job from storage, to the client, could follow the conventional print subsystem model as follows:

1. Installing a local or network printer (a one-time occurrence);
2. Selecting the targeted MFP by specifying the installed printer; and,
3. Specifying and sending a network scan job retrieval request via the installed printer's printer driver.

It would be further advantageous if a user could request the retrieval of the scan job prior to initiating the scan job (i.e., walkup operation where hardcopy document is scanned in at MFP), as well as after initiating the scan job.

SUMMARY OF THE INVENTION

The present invention solution differs from conventional practices is that:

The user does not need to identify the network address or domain name of the targeted MFP.

The user sends the network scan job retrieval request using the existing print subsystem.

The user sends the network scan job retrieval request as a print job.

The present invention process for sending a network scan job retrieval request is independent of the method used to initiate the scanning of the document, the spooling of the scan job, and the transmission of the scan image data back to the destination. For example, the user may initiate the scan from the MFP front panel, from the client, or from a 3rd component such as a server device. Likewise, the scan image data may be pushed to the client by the MFP, pulled from the MFP by the client, or scheduled and sent by a server device.

When a scan job is spooled, the scan image data need not necessarily be sent immediately to the client. Instead, the scan image data may be retained in storage, where the storage may be local to the MFP or offline (a scan server, for example). The spooled scan job stays in storage indefinitely until a subsequent request is made to retrieve the scanned image data, and transmit the scan job to a client. Once a request to retrieve the scan image data is received, the MFP despools the scanned image data by retrieving the scanned image data from storage and transmitting it to the client. If the despool is successful, the scanned image data can be deleted from storage.

Accordingly, in a network including a scanning device and a connected client, a pseudo print job method is provided for managing scan jobs. The method comprises: scanning a document at the scanning device; spooling the scan job in storage; sending a pseudo print job request to the scanning device, from a connected client; despooling the scan job from storage in response to the pseudo print job request; and, sending the scan job to a connected destination. The spooling of the scan job in storage may include storing the scan job in a scanning device internal memory, a network-connected server memory, or a connected client memory.

In one aspect of the method, the scan jobs are sent to a destination specified in the pseudo print job request. In another aspect, the scan jobs are stored in an intermediate location such as a scanning device internal memory or a network-connected server memory. Then, the pseudo print job request can be sent after the scan job has been spooled, and the scan job is despooled from the intermediate location.

Sending a pseudo print job request for the scan job includes the use of either a network scan-enabled print driver or an independent network scan application. Either way, the process sends the pseudo print job request via the client's print subsystem.

Additional details of the above-described method, and a pseudo print job system for managing scan jobs, are provided below.

DETAILED DESCRIPTION OF THE PREFERRED EMBODIMENTS

Figure 2A:
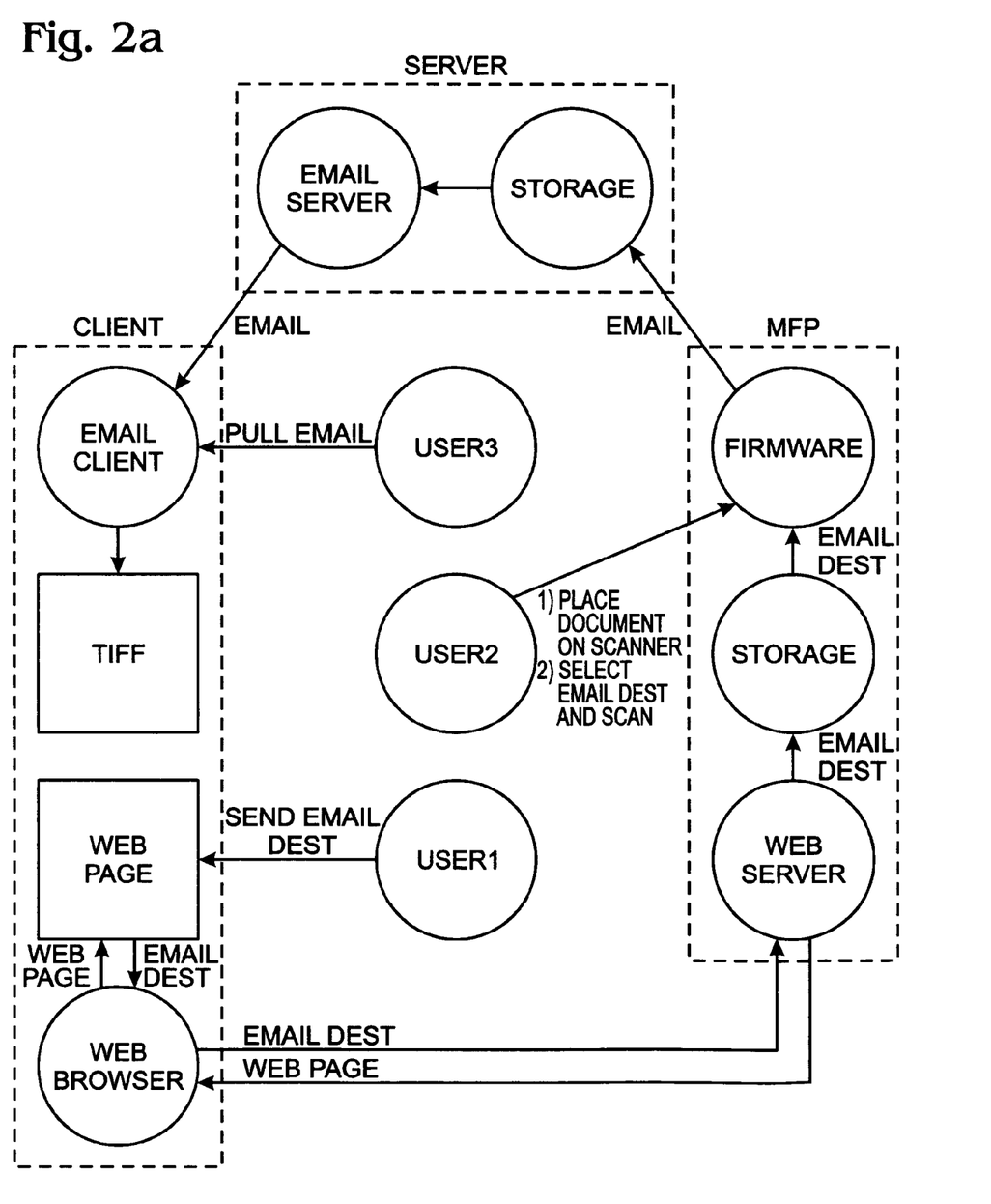
FIG. 2a is a depiction of a network-connected scanning device, without a scan driver.

FIG. 2a is a depiction of a network-connected scanning device, without a scan driver. In one method, illustrated by Sharp NST® by Sharp Corporation, the destination profiles are setup by the user through the use of a device web page from an embedded web server in the targeted MFP, such as a Leopard or Tiger MFP. In this method, the user invokes a web browser and accesses the device web page of the targeted MFP. From the device web page, the user enters destination profiles and then saves them in the MFP's local storage. For Sharp NST®, the destination profile is the user's email address.

In this example, the user can then initiate subsequent network scans by selecting the destination profile on the MFP that corresponds to their email address. The MFP then initiates the scan and sends the scan output, a TIFF document for example, as an email attachment to the corresponding email address. The user then accesses the scan job by retrieving the scan job via the user's email application.

This method suffers in that the user may select the wrong device. The user may be confused when identifying the device web page of the MFP and select a web page that is associated with an MFP that is different than the intended MFP. Alternately, the user must directly access the device. Then, the user must know the network address or domain name of the device to obtain the web page.

Figure 2B:
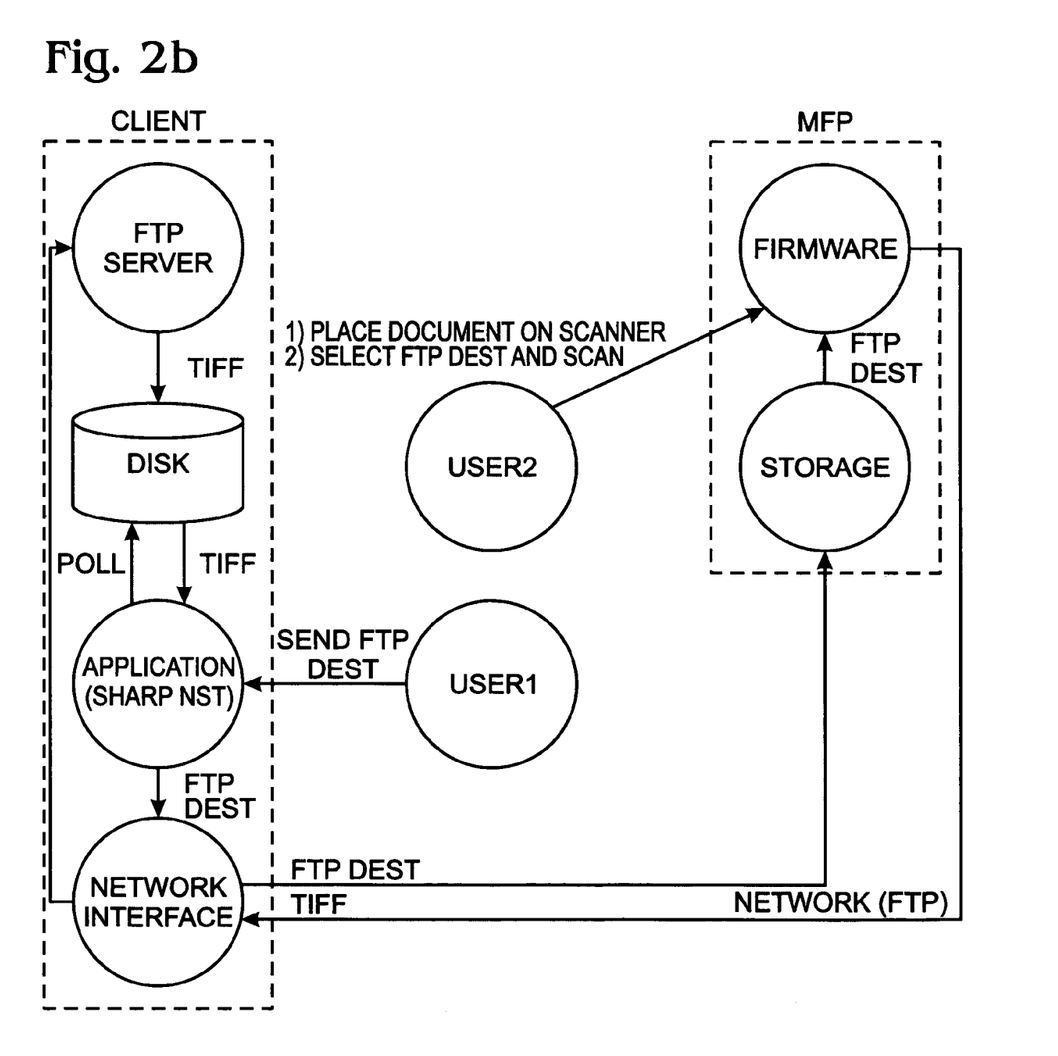
FIG. 2b is another depiction of a network-connected scanning device, without a scan driver.

FIG. 2b is another depiction of a network-connected scanning device, without a scan driver. In this method, illustrated by Sharp NST® by Sharp Corporation, the destination profiles are setup by the user on the client computing device via a network scanning enabled application (i.e., Sharp NST®). The user invokes the network scanning application and specifies a destination profile to be sent to a targeted MFP, such as a Leopard or Tiger MFP. In this case, the destination profile is a FTP server running in conjunction with the network scanning application on the client computing device. The destination profile consists of the IP address of the client computing device, the port on which the FTP server is listening, and a file system path name to where the FTP server writes the scan job (file transfer).

In this example, the user can initiate subsequent network scans by selecting the destination profile on the MFP that corresponds to their FTP server and file system path. The MFP then initiates the scan and sends the scan output as a file to the specified FTP server and corresponding file system path name.

The FTP server on the client computing device receives the scan job as a file and writes the file to the corresponding file system path name. The network scanning enabled application polls the corresponding file system path. When a file (scan job) appears in the file directory, the application recognizes the job as received and performs any operations associated with the destination. For example, an optical character recognition (OCR) process may be performed.

This method suffers in that it is easy for a user to select the wrong device. The user must know the network address or domain name of the device to which the destination profile is sent. The user must also use a network scanning enabled application for sending the destination profile.

Figure 3:
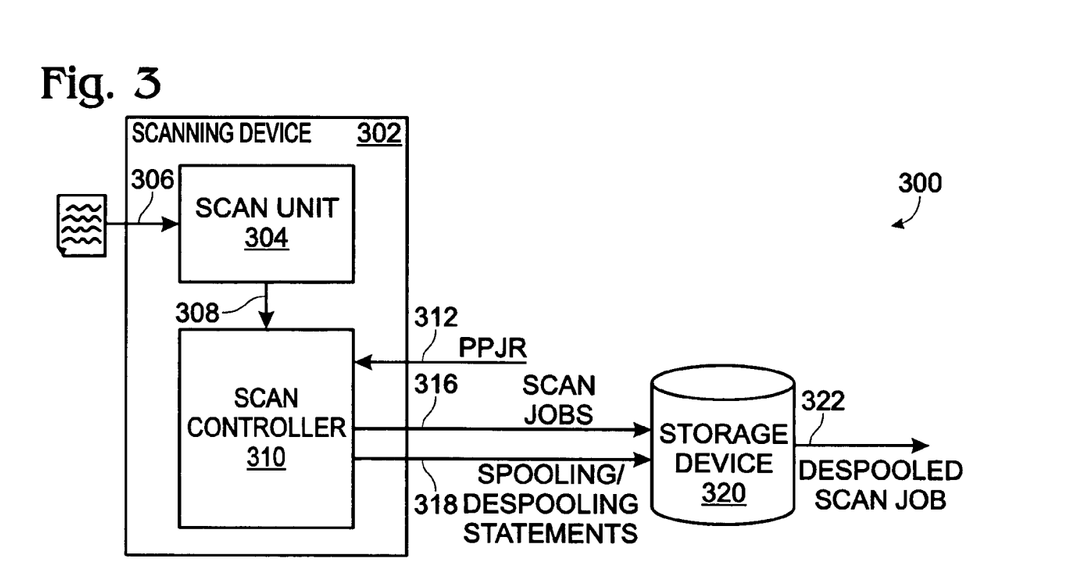
FIG. 3 is a schematic block diagram of the present invention pseudo print job system for managing scan jobs.

FIG. 3 is a schematic block diagram of the present invention pseudo print job system for managing scan jobs. The system 300 comprises a scanning device 302. The scanning device is typically an MFP, but can be any device capable of electronically scanning a document. The scanning device 302 includes a scan unit 304 having an interface on line 306 to receive a paper media document and an interface on line 308 to supply a scan job in response to scanning the document. The scan unit 304 is understood to include the conventional functions associated with a scanning device. In other aspects of the invention, the scanning receives an electronic document on line 306 for additional digital processing. Alternately, the scan unit can be a fax receiving an electronic document facsimile, or a whiteboard or electronic tablet that receives a user's handwriting as input.

The scanning device 302 also includes a scan controller 310 having an interface on line 312 to accept pseudo print job requests (PPJRs) and an interface on line 308 to accept the scan jobs. The scan controller 310 has an interface on line 316 to supply scan jobs for spooling in response to the pseudo print job request and an interface on line 318 to supply spooling/despooling statements. Although four separate interfaces are shown, it should be understood that the interfaces may be a common interface, such as an data/address bus. A storage device 320 has an interface on line 316 to accept scan jobs for spooling, an interface on line 318 to accept spooling/despooling statements, and an interface on line 322 to supply despooled scan jobs in response to despooling statements. Note, the scan jobs need not necessarily be passed through the scan controller 310, as shown. Alternately, the scan jobs may be routed directly from the scan unit 302 for spooling.

Typically, the storage device 320 stores the scan document cross-referenced to a document identifier. The document identifier can be a user name, a host (client computer) name, or an application process name (an application residing in a client, for example). The document identifier can be a job name automatically generated from the scan job image, such as the leading set of characters in the document. In another aspect, the document identifier is an automatically generated job number, such as a sequentially generated number. However, the present invention is not limited to any particular type of document identifier. In one aspect of the system, the scan controller 310 receives a command in the pseudo print job request selecting a particular storage device for spooling the scan jobs.

Figure 4:
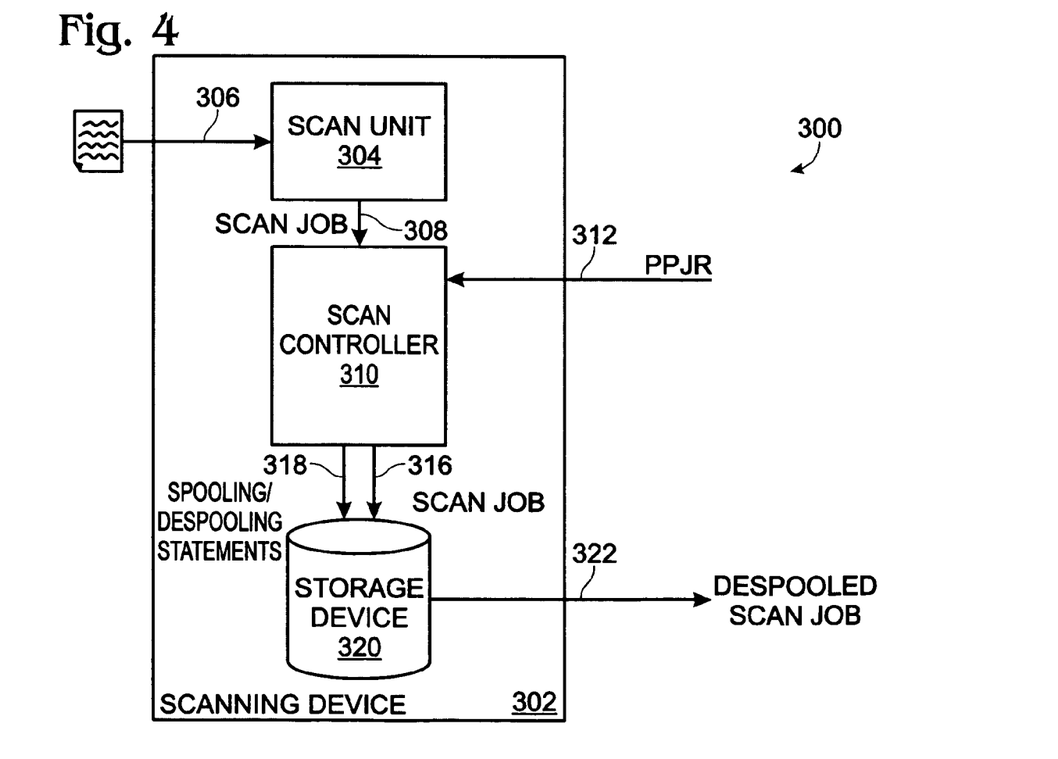
FIG. 4 is a variation of the present invention where the storage device is a memory residing in the scanning device.

FIG. 4 is a variation of the present invention where the storage device 320 is a memory residing in the scanning device 302.

Figure 5:
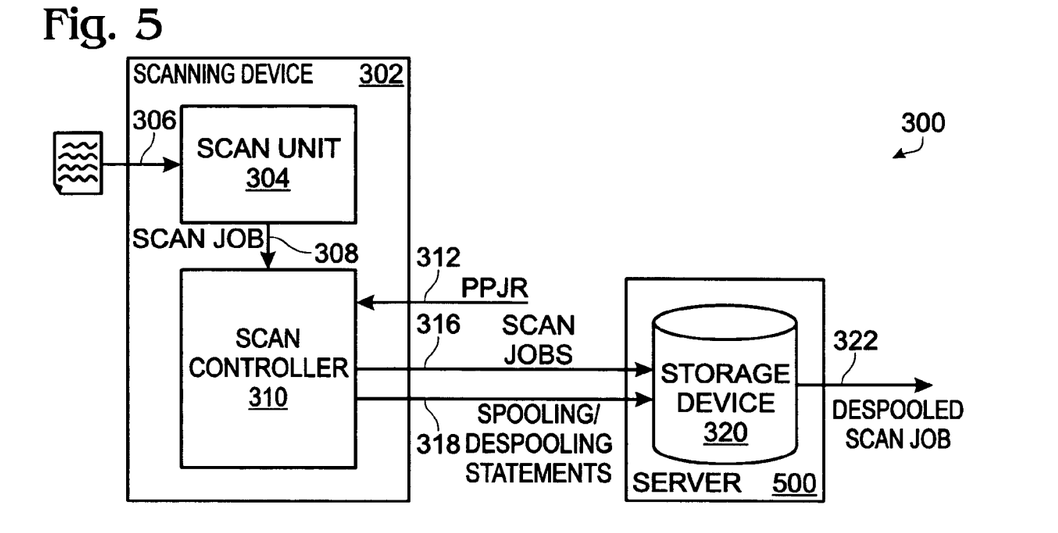
FIG. 5 is a variation of the present invention where the system further comprises a server.

FIG. 5 is a variation of the present invention where the system 300 further comprises a server. The server 500 has an interface connected to the scan controller interface on line 316 to receive scan jobs and an interface on line 318 for receiving spooling and spooling/despooling statements. In this aspect, the storage device 320 resides in the server 500.

Figure 6:
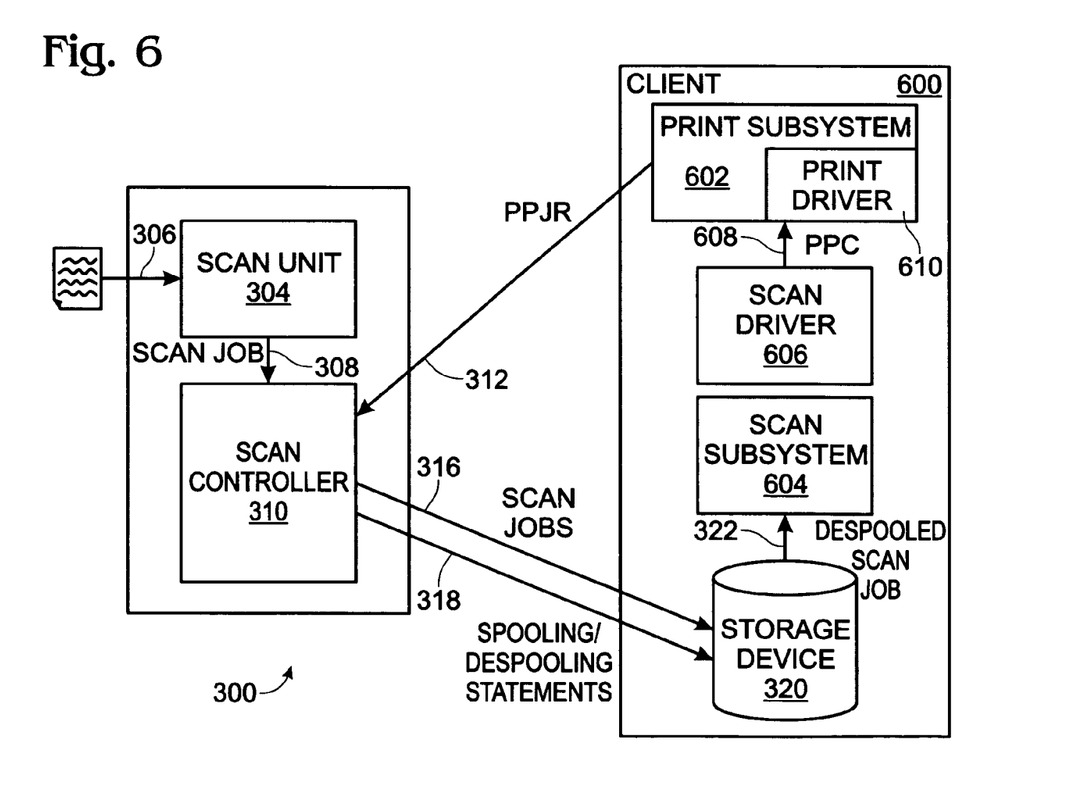
FIG. 6 is a variation of the present invention further comprising a client computing device, referred to herein as a client.

FIG. 6 is a variation of the present invention further comprising a client computing device, referred to herein as a client. The client 600 includes a print subsystem 602 having an interface connected to the scan controller interface on line 312 to supply the pseudo print job request. A scan subsystem 604 has an interface on line 322 to receive the despooled scan job from the storage device 320. In this aspect, the storage device 320 resides with the client 600. Except for the aspect of the pseudo print job request, the above-described print subsystem 602 and scan subsystem 604 are understood to be conventional software components associated with a personal computer, or the like.

In one aspect, the scan controller 310 receives a command in the pseudo print job request specifying the destination to which the despooled scan job is sent. Although only a single client 600 is shown, it should be understood that the request may originate from a first client, such as client 600, while the destination may be second client (not shown) connected to the scanning device 302.

The client 600 further includes a scan driver 606 having an interface on line 608 to supply pseudo print commands (PPCs). The print subsystem 602 has an interface on line 608 to receive the pseudo print commands. The print subsystem 602 supplies the pseudo print job request on line 312 with PJL statements including a document identifier, a destination, and a despooling command. Typically, the client 600 includes a print driver 610 associated with the print subsystem 602. In one aspect of the system 600, the scan driver 606 is a component of the print driver 610. That is, the print driver is able to support a user interface (UI) for (conventional) printing operations, as well as scanning operations. In another aspect, the scan driver 606 is an independent network scan application.

The scan driver 606 may be enabled to support other functions besides the sending of destination profiles and pseudo print job requests. In one aspect, the scan driver (UI) can be used to select a target scanning device using a menu of options such as: a scanning device locally connected to the client; a scanning device network-connected to the client via a print server; a scanning device selected using a network address; a scanning device selected using a domain name; or, a scanning device selected using a discovery process.

Analogous to a print driver, the scan driver 606 can also be enabled to select scan options such as accounting information, security, scheduling, image manipulation, image formatting, image reduction, image compression, and storage location.

It should be understood that the scan driver 606 aspect of the invention, described in detail above, is also applicable to variations where the scan jobs are spooled in the scanning device 302 (FIG. 4) or spooled on a server (FIG. 5). Alternately stated, it would be typical that the pseudo print job requests shown in FIGS. 4 and 5 be delivered via a client print subsystem, from a scan driver.

In another aspect of the system 300, the scan controller 310 may receive a pseudo print job request with a document identifier to identify a subsequently scanned document. Further, the scan controller 310 may receives a pseudo print job request prior to scanning a document, with a scan job destination formatted as either a (permanent) destination profile and a (one-time) scan job request. The scan controller 310 sends the scan job to the destination specified in the pseudo print job request. The destination can be a user identity, application process, or a client terminal. An application process is understood to a computer program running on a client. The computer program (e.g., FTP server) has some means of identification (e.g., name in client's process table) and communication (e.g., remote procedure call (RPC)).

In this aspect, the scan controller 310 may receive a pseudo print job request with PJL statements including a document identifier, a destination, and a conditional despooling command. Then, the scan controller 310 supplies despooling statements to the storage device 320, in response to the received conditional despooling commands. The conditional despooling commands may request that the scan job be despooled immediate, or delayed with respect to time or some other condition. In another aspect, event triggered despooling is enabled. Again, it should be understood that the conditional despooling commands may be enabled with any of the variations of the invention depicted in FIGS. 4 through 6.

Functional Description

Scan Spooling

Figure 7:
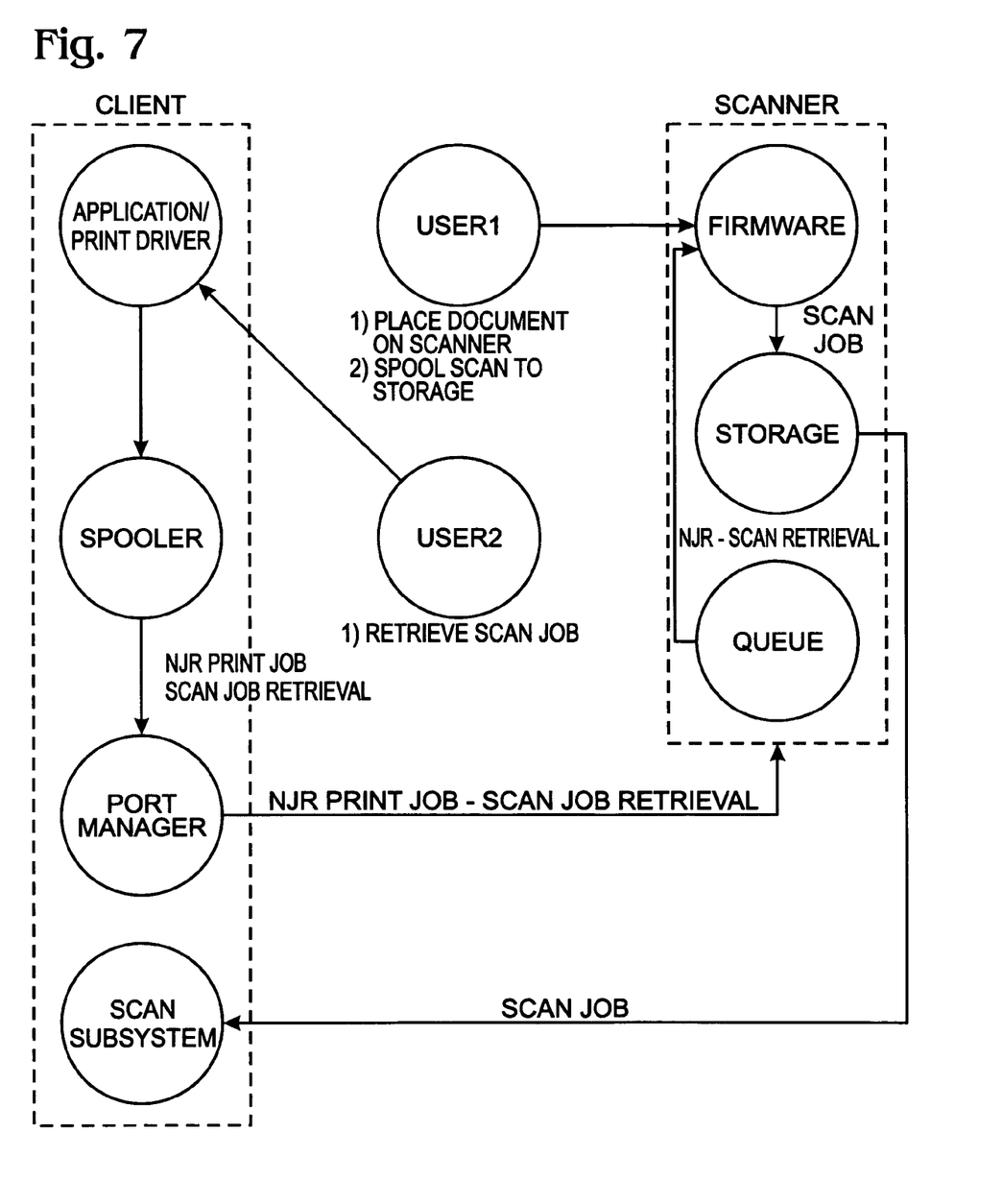
FIGS. 7 and 8 depict aspects of the invention where the destination profiles are not client entered.
Figure 8:
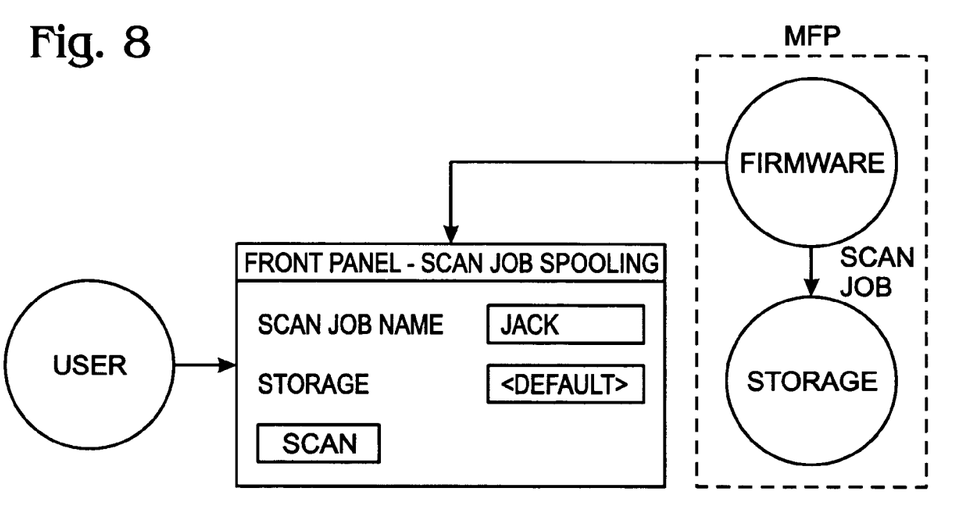

FIGS. 7 and 8 depict aspects of the invention where the destination profiles are not client entered. The user places the document(s) to be scanned on the scanner and initiates the spooling of a scan job from either the front panel of an MFP, or a remote location, such as accessing the device web page. Note, the invention is not limited to any particular source. The initiation of the spooling of the scan job requires a unique identifiable name, recognizable to the user, be assigned to the spooled scan job. This name may be assigned in any of the following ways:

Manual entry of job name by the user.

Automatic generation of a job name from the document image.

Automatic generation of a job ID (e.g., numerical cardinal ordering).

The MFP scans the document(s) and spools the scanned image data to storage with the associated job name/ID. The storage location may be predefined or optionally specified by the user.

Scan Despooling by Pseudo Print Job—by User

Figure 9:
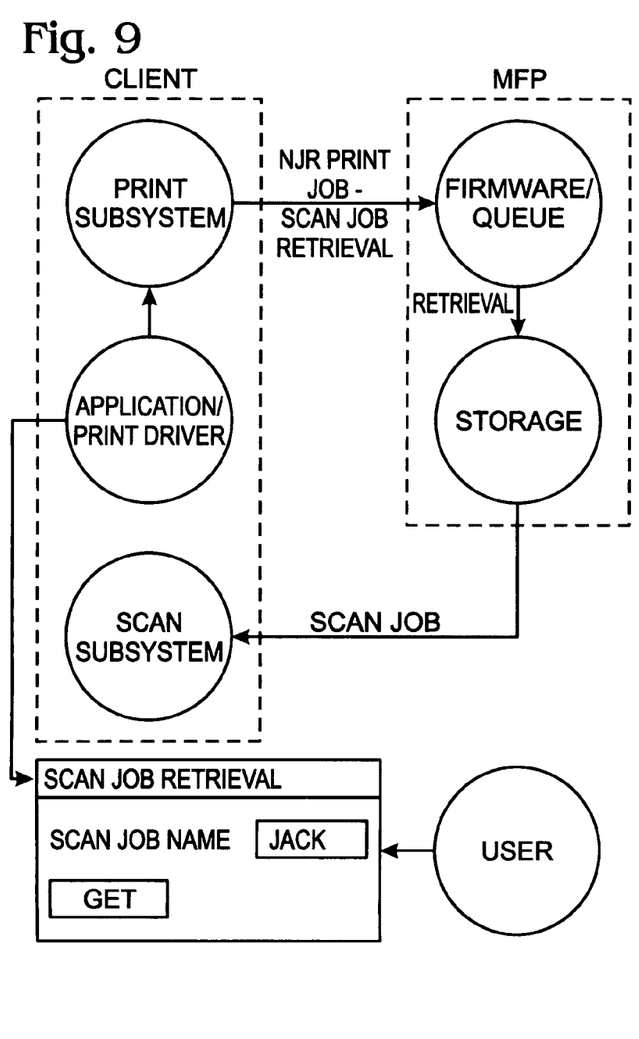
FIGS. 9 and 10 depict scan job despooling initiated from a client.
Figure 10:
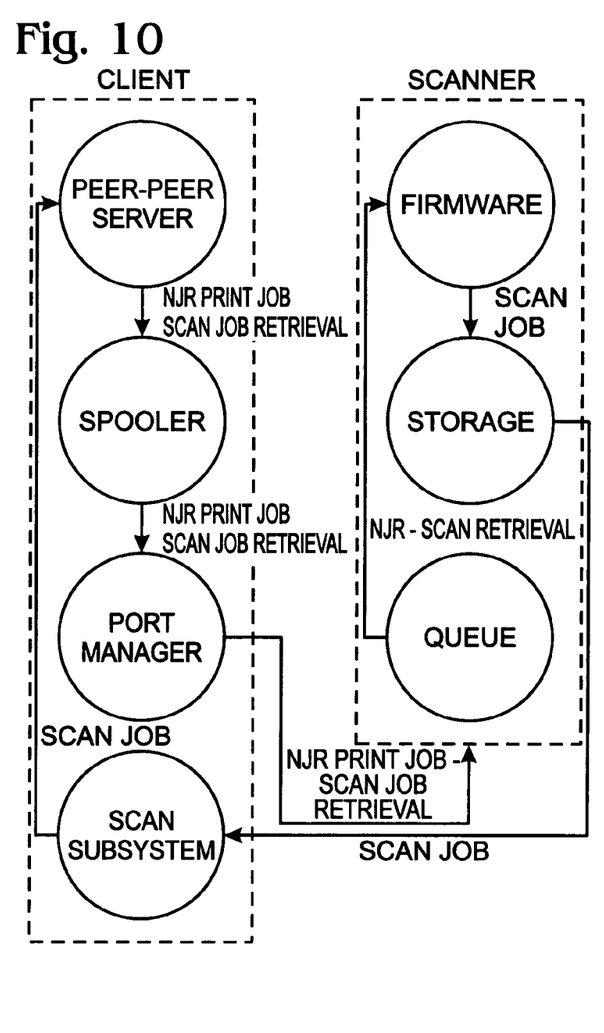

FIGS. 9 and 10 depict scan job despooling initiated from a client. The user may initiate the despooling of the spooled scan job using:

A network scan-enabled printer driver associated with a scanning device or MFP; or, A network scan application.

The user selects the targeted scanning device or MFP by:

Selecting a local or network installed MFP (scanning device), such as a printer from a printers folder in Microsoft family of operating systems for example.

Selecting a network MFP from an accessible print server.

Selecting an MFP by specifying the MFP's network address or domain name (i.e., peer-peer) or queue (i.e., network).

Selecting an MFP through a discovery method.

In one aspect, the printer driver and scan driver are combined into a single driver, referred to herein as a scan-enabled print driver. To retrieve the spooled scan job(s) from storage from the selected MFP(s), the user can:

Invoke the scan-enabled print driver. In Microsoft, right click on scan-enabled print driver in printer's folder, for example.

Locate the scanning portion of the scan-enabled print driver. Select properties and then select the scan tab.

Specify the scan option for identify (i.e., naming) the spooled scan job.

Specify any additional scan options, such as:
  Accounting Information
  Security
  Scheduling
  Image Manipulation
  Storage Location Select OK to despool the scan job from storage to the client.

In an alternate aspect, the above-mentioned capability is built into a network scan application instead of the printer driver. For example, the network scan application can be Sharp NST.

The scan application or scan-enabled printer driver, packages the scan job retrieval request into a print job. The print job does not contain any print data, and it is called a pseudo print job. The instructions for the scan job retrieval request appear in the print job as a sequence of commands. For example, these commands may be proprietary PJL statements, and may appear as follows:

```
<Esc>%-12345X@PJL
@PJL RESET
@PJL SET SCANNAME="Jack"
@PJL SET SCANCLIENT="172.29.23.7:5007,myclient"
@PJL SET SCANACTION=DESPOOL
...
<Esc>%-12345X
```

The print job is then sent through the client's print subsystem. For example, in the Microsoft Windows family of operating systems, the pseudo print job would be spooled to the printer spooler. The printer spooler would then, immediately or with delay, despool the pseudo print job.

When the scanning device or MFP receives the pseudo print job, the MFP firmware interpreter recognizes the pseudo print job as a scan job retrieval request and performs the corresponding appropriate action.

Scan Despooling by Pseudo Print Job—by Automated Process

FIG. 10 also depicts an automated process for initiating the sending of a scan job retrieval request. For example, a peer-peer server associated with a network scanning enabled application can be used. The automated process, upon instantiation or event trigger, sends scan job retrieval requests to the specified scanning devices.

The scan job retrieval request(s) can be constructed to be user specific, job specific, or event triggered. The user specific automated process creates a scan job retrieval request for all jobs associated with a specific user. All the matching spooled scan jobs may be automatically despooled, or some handshaking protocol may be used to determine a subset of spooled scan jobs to despool. The job specific automated process creates a scan job retrieval request for a specific scan job. The name of the scan job is obtained by some other process, such as a name prerecorded by the user, or derived from some triggering user action. The event specific automated process creates a destination profile or scan job request in response to an event trigger.

The scanning devices send the destination profile or scan request to:
  1. A predefined list of MFPs.
  2. A list of discovered MFPs.
  3. A list of MFPs associated with the invocation of the automated process.

The sending of the destination profile is also independent of the method used to initiate the scanning of the document and the transmission of the scan image data back to the destination. A scan destination profile is typically used in subsequent automatic scanning. The destination profile can be permanently loaded into a storage that is accessible to a scanning device (e.g., local or server). The user can then initiate subsequent scan jobs from the front panel, or remote interface, by selecting a destination profile. The scan job can automatically be scanned and transmitted. In other cases, the scan job may be spooled to storage and the transmission of the scan job to the client may take another command request.

A scan job request is used only once; it is a temporary destination profile. The scan job request can be loaded into a scan queue (scan job list) that is either locally or network server accessible to the scanning device. The user can initiate subsequent scan jobs from the front panel, or remote interface, by interactively selecting a scan job request from the scan queue. After the scan job is scanned and transmitted, the scan job request is deleted from the scan queue.

Figure 11:
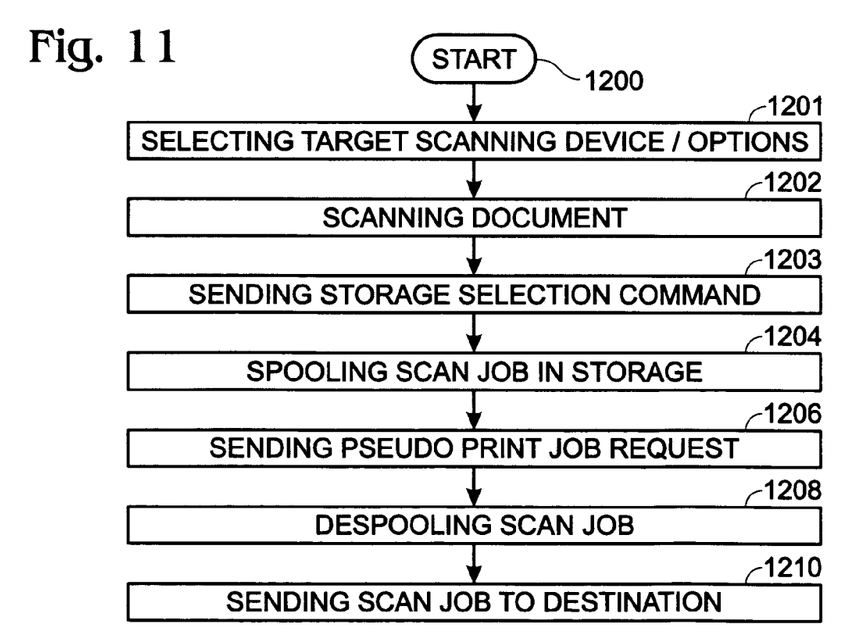
FIG. 11 is a flowchart illustrating the present invention pseudo print job method for managing scan jobs in a network including a scanning device and a connected client.

FIG. 11 is a flowchart illustrating the present invention pseudo print job method for managing scan jobs in a network including a scanning device and a connected client. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 1200.

Step 1202 scans a document at the scanning device. Step 1204 spools the scan job in storage. Step 1206 sends a pseudo print job request to the scanning device, from a connected client. Step 1208 despools the scan job from storage in response to the pseudo print job request. Step 1210 sends the scan job to a connected destination. In one aspect of the method, sending the scan job to a destination in Step 1210 includes sending the scan job to a destination specified in the pseudo print job request.

Typically, spooling the scan job in storage in Step 1204 includes storing the scan document cross-referenced to a document identifier such as a user name, a host name, an application process name, a job name automatically generated from the scan job image, or an automatically generated job number. In other aspects, Step 1204 stores the scan job in a memory such as a scanning device internal memory, a network-connected server memory, or a connected client memory. The method is not limited to any particular memory location. In one aspect a further step, Step 1203 sends a command selecting a spooling storage location. Then, Step 1204 spools the scan job in the selected storage location.

In another aspect, spooling the scan job in storage (Step 1204) includes spooling the scan job in an intermediate location such as a scanning device internal memory or a network-connected server memory. Then, sending the pseudo print job request in Step 1206 includes sending the request after the scan job has been spooled, and Step 1208 despools the scan job from the intermediate location.

In one aspect, Step 1206 includes sending a pseudo print job request with PJL statements including a document identifier, a destination, and a despooling command. As mentioned above, Step 1206 sends a pseudo print job request for the scan job using either a network scan-enabled print driver or an independent network scan application. Either way, Step 1206 sends the pseudo print job request via the client's print subsystem.

In some aspects a further step, Step 1201, prior to sending the pseudo print job request, selects a target scanning device from the group including:
a locally installed scanning device on the client;
a network scanning device connected via a print server;
a scanning device selected using a network address;
a scanning device selected using a domain name; or,
a scanning device selected using a discovery process.

Further, Step 1201 may select scan options chosen from the group including accounting information, security, scheduling, image manipulation, image formatting, image reduction, image compression, and storage location.

The sending of the pseudo print job request (Step 1206) may occur either before or after the document is scanned (Step 1202). If it occurs before Step 1202, the request may be sent with a document identifier to identify a subsequently scanned document. If the pseudo print job request is sent before Step 1202, the request may include either a destination profile or a scan job request. Then, Step 1210 sends the scan job to the destination specified in the pseudo print job request. The destination can be a user identity, an application process, or a client terminal.

Further, if Step 1206 occurs before Step 1202, the pseudo print job request that is sent may include a conditional despooling command as a PJL statement, in addition to a document identifier and a destination. The conditional spooling command may be used to select either immediate, delayed, or event triggered despooling.

A system and method have been provided for retrieving scan jobs using pseudo print requests delivered via a print subsystem. Examples have been given of the invention in different network environments, but the invention is not limited to any particular kind of scanning device connections. Specific communications have also been described for delivering destination profiles and despooling requests. Again, the invention is not limited to these examples. Although the invention has generally been explained in the context of a Microsoft Windows operating system, the invention can also be practiced with the spooling and despooling subsystems of a Apple MacIntosh Operating System, Linux Operating System, System V Unix Operating Systems, BSD Unix Operating Systems, OSF Unix Operating Systems, Sun Solaris Operating Systems, HP/UX Operating Systems, or IBM Mainframe MVS and AS/400 Operating System, to name a limited list of other possibilities. Other variations and embodiments of the invention will occur to those skilled in the art.

I claim:

1. A pseudo print job system for managing scan jobs, the system comprising:
a scanning device including:
a scan unit having an interface to receive a document and an interface to supply a scan job in response to scanning the document; and,
a scan controller having an interface to accept pseudo print job requests, to accept the scan jobs, to supply scan jobs for spooling in response to the pseudo print job request, the scan jobs cross-referenced to a document identifier selected from a group consisting of a user name, a host name, an application process name, a job name automatically generated from the scan job image, and an automatically generated job number, and to supply spooling/despooling statements;
a storage device having an interface to accept scan jobs for spooling, to accept spooling/despooling statements, to store scan jobs cross-referenced to document identifiers, and to supply despooled scan jobs in response to despooling statements.

2. The system of claim 1 wherein the storage device is a memory residing in the scanning device.

3. The system of claim 1 further comprising:
a server having an interface connected to the scan controller interface to receive scan jobs for spooling and to receive spooling/despooling statements; and,
wherein the storage device resides in the server.

4. The system of claim 1 further comprising:
a client including:
a print subsystem having an interface connected to the scan controller interface to supply the pseudo print job request;
a scan subsystem having an interface to receive the despooled scan job from the storage device; and,
wherein the storage device resides with the client.

5. The system of claim 1 wherein the scan controller receives a command in the pseudo print job request selecting a particular storage device for spooling the scan jobs.

6. The system of claim 1 wherein the scan controller receives a command in the pseudo print job request specifying the destination to which the despooled scan job is sent.

7. The system of claim 1 further comprising:
a client including:
a scan driver having an interface to supply pseudo print commands; and,
a print subsystem having an interface to receive the pseudo print commands and an interface connected to the scan controller interface to supply the pseudo print job request with PJL statements including a document identifier, a destination, and a despooling command.

8. The system of claim 7 wherein the client further includes a print driver; and,
wherein the scan driver is a component of the print driver.

9. The system of claim 7 wherein the scan driver is an independent network scan application.

10. The system of claim 7 wherein the scan driver selects a target scanning device using a menu of options selected from the group including:
a scanning device locally connected to the client;
a scanning device network-connected to the client via a print server;
a scanning device selected using a network address;
a scanning device selected using a domain name; and,
a scanning device selected using a discovery process.

11. The system of claim 7 wherein the scan driver selects scan options chosen from the group including accounting information, security, scheduling, image manipulation, image formatting, image reduction, image compression, and storage location.

12. The system of claim 1 wherein the scan controller receives a pseudo print job request with a document identifier to identify a subsequently scanned document.

13. The system of claim 1 wherein the scan controller receives a pseudo print job request prior to scanning a document, with a scan job destination in a format selected from the group including a destination profile and a scan job request, and sends the scan job to the destination specified in the pseudo print job request.

14. The system of claim 13 wherein the scan controller receives a pseudo print job request with PJL statements including a document identifier, a destination, and a conditional despooling command.

15. The system of claim 14 wherein the scan controller supplies despooling statements to the storage device, in response to the received conditional despooling commands, selected from the group including immediate, delayed, and event triggered despooling.

16. The system of claim 13 wherein the scan controller sends the scan job to a destination selected from the group including a user identity, application process, and a client terminal.

17. In a network including a scanning device and a connected client, a pseudo print job method for managing scan jobs, the method comprising:
   scanning a document at the scanning device;
   spooling the scan job in storage memory selected from a group consisting of a scanning device internal memory, a network-connected server memory, and a connected client memory;
   sending a pseudo print job request to the scanning device, from a connected client;
   despooling the scan job from storage in response to the pseudo print job request; and,
   sending the scan job to a connected destination.

18. The method of claim 17 wherein spooling the scan job in storage includes storing the scan job cross-referenced to a document identifier.

19. The method of claim 18 wherein storing the scan job cross-referenced to a document identifier includes using a document identifier selected from the group including a user name, a host name, an application process name, a job name automatically generated from the scan job image, and an automatically generated job number.

20. The method of claim 17 further comprising:
   sending a command selecting a spooling storage location; and,
   wherein spooling the scan job in storage includes spooling the scan job in the selected storage location.

21. The method of claim 17 wherein sending the scan job to a destination includes sending the scan job to a destination specified in the pseudo print job request.

22. The method of claim 17 wherein spooling the scan job in storage includes spooling the scan job in an intermediate location selected from the group including a scanning device internal memory and a network-connected server memory;
   wherein sending the pseudo print job request includes sending the request after the scan job has been spooled; and,
   wherein despooling the scan job includes despooling the scan job from the intermediate location.

23. The method of claim 22 wherein sending a pseudo print job request for the scan job includes sending a pseudo print job request with PJL statements including a document identifier, a destination, and a despooling command.

24. The method of claim 17 wherein sending a pseudo print job request for the scan job includes using an application selected from the group including a network scan-enabled print driver and an independent network scan application.

25. The method of claim 24 further comprising:
   prior to sending the pseudo print job request, selecting a target scanning device from the group including:
   a locally installed scanning device on the client;
   a network scanning device connected via a print server;
   a scanning device selected using a network address;
   a scanning device selected using a domain name; and,
   a scanning device selected using a discovery process.

26. The method of claim 24 further comprising:
   prior to sending the pseudo print job request, selecting scan options chosen from the group including accounting information, security, scheduling, image manipulation, image formatting, image reduction, image compression, and storage location.

27. The method of claim 24 wherein sending a pseudo print job request for the scan job includes sending the request via the client's print subsystem.

28. The method of claim 17 wherein sending a pseudo print job request includes sending a request with a document identifier to identify a subsequently scanned document.

29. The method of claim 17 wherein sending a pseudo print job request includes sending the request prior to scanning the document, with a destination in a format selected from the group including a destination profile and a scan job request; and,
   wherein sending the scan job to a destination includes sending the scan job to the destination specified in the pseudo print job request.

30. The method of claim 29 wherein sending a pseudo print job request includes sending a request with PJL statements including a document identifier and a destination, and a conditional despooling command.

31. The method of claim 29 wherein sending the scan job to a destination includes sending the scan job to a destination selected from the group including a user identity, an application process, and a client terminal.

32. The method of claim 29 wherein despooling the scan job includes despooling the scan job in response to a conditional spooling command selected from the group including immediate, delayed, and event triggered despooling.

33. A pseudo print job system for managing scan jobs, the system comprising:
   a scanning device including:
      a scan unit having an interface to receive a document and an interface to supply a scan job in response to scanning the document; and,
      a scan controller having an interface to accept pseudo print job requests, to accept the scan jobs, to supply scan jobs for spooling in response to the pseudo print job request, and to supply spooling/despooling statements;
      a storage device having an interface to accept scan jobs for spooling, to accept spooling/despooling statements, and to supply despooled scan jobs in response to despooling statements;
   a client including:
      a scan driver having an interface to supply pseudo print commands; and,
      a print subsystem having an interface to receive the pseudo print commands and an interface connected to the scan controller interface to supply the pseudo print job request with PJL statements including a document identifier, a destination, and a despooling command.

34. A pseudo print job system for managing scan jobs, the system comprising:

a scanning device including:
 a scan unit having an interface to receive a document and an interface to supply a scan job in response to scanning the document; and,
 a scan controller having an interface to accept pseudo print job requests, to accept the scan jobs, to supply scan jobs for spooling in response to the pseudo print job request, and to supply spooling/despooling statements;
 a storage device having an interface to accept scan jobs for spooling, to accept spooling/despooling statements, and to supply despooled scan jobs in response to despooling statements; and,
 wherein the scan controller receives a pseudo print job request prior to scanning a document, with a scan job destination in a format selected from a group consisting of a destination profile and a scan job request, and sends the scan job to the destination specified in the pseudo print job request.

35. In a network including a scanning device and a connected client, a pseudo print job method for managing scan jobs, the method comprising:

scanning a document at the scanning device;
spooling the scan job in storage, cross-referenced to a document identifier selected from a group consisting of a user name, a host name, an application process name, a job name automatically generated from the scan job image, and an automatically generated job number;
sending a pseudo print job request to the scanning device, from a connected client;
despooling the scan job from storage in response to the pseudo print job request; and,
sending the scan job to a connected destination.

36. In a network including a scanning device and a connected client, a pseudo print job method for managing scan jobs, the method comprising:

scanning a document at the scanning device;
spooling the scan job in an intermediate location selected from a group consisting of a scanning device internal memory and a network-connected server memory;
sending a pseudo print job request to the scanning device, from a connected client after the scan job has been spooled;
despooling the scan job from the intermediate location in response to the pseudo print job request; and,
sending the scan job to a connected destination.

37. In a network including a scanning device and a connected client, a pseudo print job method for managing scan jobs, the method comprising:

scanning a document at the scanning device;
spooling the scan job in storage;
prior to scanning the document, sending a pseudo print job request to the scanning device from a connected client, with a destination in a format selected from a group consisting of a destination profile and a scan job request;
despooling the scan job from storage in response to the pseudo print job request; and,
sending the scan job to the destination specified in the pseudo print job request.

* * * * *